United States Patent [19]
Clemente

[11] Patent Number: 5,599,149
[45] Date of Patent: Feb. 4, 1997

[54] SELF-TAPPING FLOOR SCREW

[75] Inventor: Vince Clemente, Berwyn, Ill.

[73] Assignee: Anchor Bolt and Screw Company, Melrose Park, Ill.

[21] Appl. No.: 395,788

[22] Filed: Feb. 28, 1995

[51] Int. Cl.$^6$ .............................. F16B 25/00; F16B 35/04
[52] U.S. Cl. .............................. 411/386; 411/420; 411/426
[58] Field of Search .............................. 411/386, 387, 411/418, 420, 421, 426

[56] References Cited

U.S. PATENT DOCUMENTS

| | | | |
|---|---|---|---|
| 2,165,011 | 7/1939 | Rosenberg | 411/420 |
| 2,232,337 | 2/1941 | Meersteiner | 411/420 X |
| 2,278,411 | 4/1942 | Braendel | 411/386 |
| 2,293,930 | 8/1942 | Braendel | 411/420 |
| 2,823,574 | 2/1958 | Rosan | 411/386 |

OTHER PUBLICATIONS

Anchor Bolt and Screw Company drawing dated Jan. 14, 1982, Drawing No. ABM 5307, 1 sheet.

*Primary Examiner*—Neill R. Wilson
*Attorney, Agent, or Firm*— Marshall, O'Toole, Gerstein, Murray & Borun

[57] ABSTRACT

A self-tapping screw fastener includes a shank having first and second ends and a head disposed at the second end of the shank. The shank has a tapered portion of a predetermined axial length adjacent the first end, and the tapered portion terminates at the first end in a substantially circular end surface having a first diameter. The shank also has a substantially cylindrical portion having a second diameter extending from the second end to the tapered portion. A thread extends helically along a circumferential outer surface of the shank from a location near the head substantially to the first end such that the thread at least partially covers the cylindrical and tapered portions of the shank. The ratio of the axial length of the tapered portion to the diameter of the end surface exceeds substantially 1.5, and the diameter of the end surface is less than but substantially equal to the diameter of the cylindrical portion of the shank.

18 Claims, 1 Drawing Sheet

SELF-TAPPING FLOOR SCREW

TECHNICAL FIELD

The present invention relates generally to screw fasteners and, more particularly, to a self-tapping floor screw having a point geometry designed for low screw seating time and seating and back-out torque requirements.

BACKGROUND ART

Self-tapping floor screws are typically employed to securely fasten parts together in high-stress environments. For example, FIG. 1 depicts a portion of a flat-bed trailer 10 including a pair of generally steel cross-members 12, 14 and a plurality of generally wooden trailer floor decking planks 16 secured to the cross-members 12, 14 by a plurality of self-tapping floor screws 18. In constructing the trailer 10, screw holes 20 are pre-drilled in the cross-members 12, 14, and in the planks 16, but the holes 20 are not tapped (i.e., pre-threaded) to receive the screws 18. Instead, the screw holes 20 are tapped when the self-tapping screws 18 are first screwed into the originally untapped screw holes 20.

Because, as shown in FIG. 1, a sizeable number of screws 18 is used in a typical application of such screws 18, the aggregate time required to seat all of the screws 18 (i.e., to screw them completely into the corresponding holes 20) can be quite significant. The time required to insert a screw 18 in an untapped hole 20 (referred to hereinafter as the "total time") is further augmented by the inherent difficulty of locating the screws 18 in the untapped holes 20 to initiate the thread tapping process and by the substantial torque that must be generated to tap the screws 18 into the holes 20 in the steel cross-members 12, 14. To reduce the total time, prior-art self-tapping screws have been provided with slightly tapered ends to facilitate locating the tapered ends of the screws 18 in untapped holes 20 and to ease the tapping of the holes 20 by the screws 18. In addition, notches or flutes (described in more detail below) have been cut into the tapered ends of the screws 18 to aid the screws 18 in cutting or tapping threads into the holes 20 in the steel cross-members 12, 14. However, the total time for inserting these prior-art screws 18 into untapped holes 20 remains undesirably high. One prior-art self-tapping screw has five such flutes equally spaced around the circumference of the tapered end thereof.

SUMMARY OF THE INVENTION

A self-tapping floor screw in accordance with the present invention has a lower total time for insertion than the prior-art self-tapping screws described above and further has lower seating and back-out torque requirements than many screws in the prior art.

According to one aspect of the present invention, a screw includes a shank having first and second ends and a head disposed at the second end. The shank has a tapered portion having a predetermined axial length adjacent the first end, and the tapered portion terminates at the first end in a substantially circular end surface having a first diameter. The shank also has a substantially cylindrical portion having a second diameter extending from the second end to the tapered portion. A threaded portion extends helically along a circumferential outer surface of the shank from a location near the head substantially to the first end, such that the threaded portion at least partially covers the cylindrical and tapered portions of the shank.

In accordance with the principles of the present invention, the ratio of the axial length of the tapered portion to the diameter of the end surface exceeds substantially 1.5, and the diameter of the end surface is less than, but substantially equal to, the diameter of the cylindrical portion of the shank.

In a constructed embodiment of the invention, the tapered portion of the screw preferably has a taper angle substantially equal to twelve degrees. Also preferably, the first diameter of the end surface of the shank is substantially 0.206 inches, the second diameter of the cylindrical portion of the shank is substantially 0.2732 inches, and the axial length of the tapered portion of the shank is substantially 0.315 inches.

In accordance with one embodiment of the present invention, the tapered portion of the screw has exactly four flutes disposed at least partially therein and extending along the shank, wherein each of the four flutes in the tapered portion intersects the threaded portion of the screw. In that embodiment, the thread preferably includes first and second thread portions, the first thread portion extending helically along at least a portion of the tapered portion of the shank, and the second thread portion extending helically along at least a portion of the cylindrical portion of the shank. Each flute may intersect the first and second thread portions and, preferably, intersects the second thread portion exactly once. Also in accordance with that embodiment, the first thread portion preferably extends helically along the entire tapered portion of the shank.

Also, each flute is disposed substantially along a line that is transverse to, and preferably skewed with respect to, a longitudinal axis of the shank.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DESCRIPTION OF THE PREFERRED EMBODIMENTS

Figure 1:
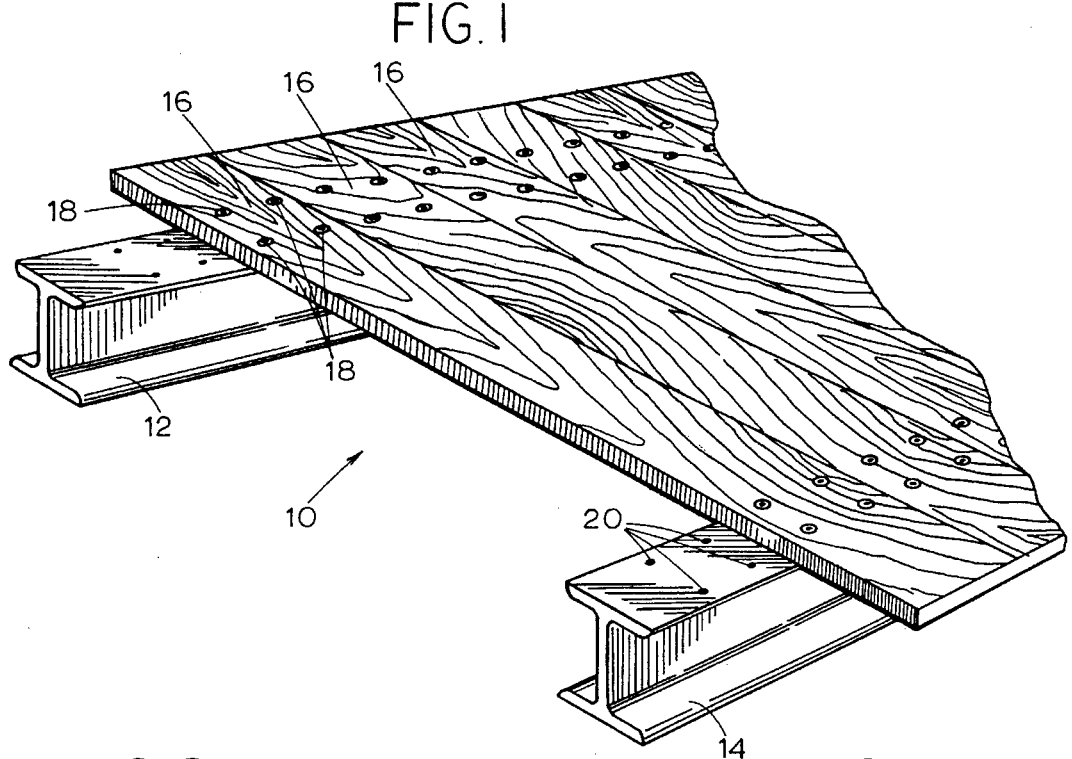
FIG. 1 is a fragmentary isometric view of a flat-bed trailer deck which may be assembled either with prior-art screws or with the screws according to the present invention.
Figure 2:
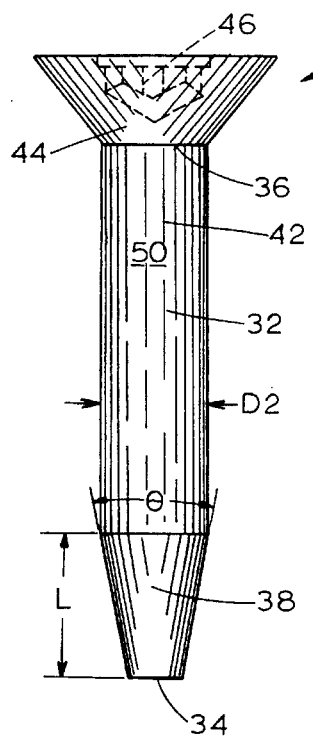
FIG. 2 is a side view of an unthreaded blank from which a screw according to the present invention is made.
Figure 3:
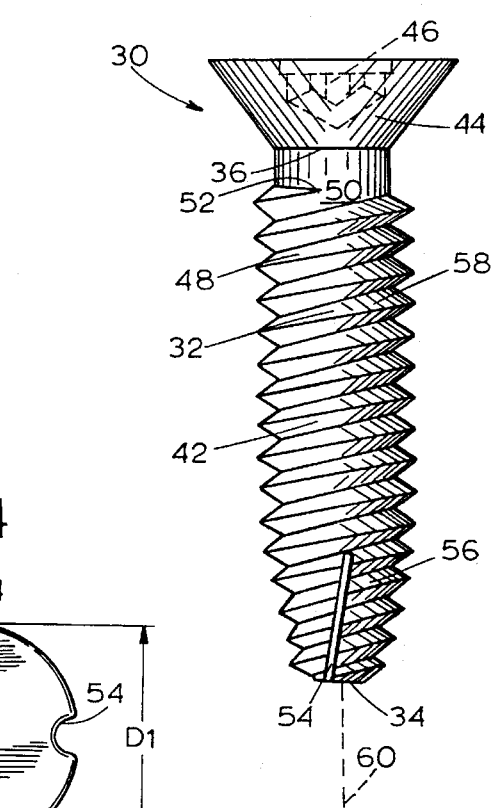
FIG. 3 is a side view of a screw according to the present invention made from the blank of FIG. 2.
Figure 4:
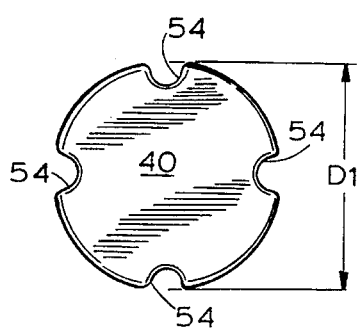
FIG. 4 is a view of the bottom end of the screw of FIG. 3.

Referring generally to FIGS. 2-4, a self-tapping floor screw 30 according to the present invention has a shank 32 having a first end 34 and a second end 36. The shank 32 also has a tapered portion 38 having a predetermined axial length L. The tapered portion 38 is disposed adjacent the first end 34 of the shank 32 and terminates at the first end 34 in a substantially circular end surface 40 (shown only in FIG. 4). The end surface 40 has a first diameter D1 as also shown in FIG. 4. The shank 32 also has a substantially cylindrical portion 42 which has a second diameter D2 and which extends from the second end 36 to the tapered portion 38 of the shank 32.

The screw 30 has a head 44 disposed at the second end 36 of the shank 32. The head 44 may be a conventional screw head having a recess 46 for receiving any desired type of screwdriver (e.g., flat-head, phillips, allen, Torx®, etc.), or the screw 30 may have a hex-head or any other type of head 32, as desired. As shown in FIGS. 2 and 3, the head may be beveled for counter-sinking, if necessary, but any suitable configuration may be employed for the head 44.

Referring now to FIG. 3, the screw 30 has a thread 48 that extends helically along a circumferential outer surface 50 of the shank 32 from a location 52 near the head 44 substantially to the first end 34 of the shank 32 such that the thread 48 at least partially covers each of the tapered and cylindrical portions 38, 42 of the shank 32. The location 52 at which the thread 48 begins can be spaced by any desired distance from the second end 36 of the shank 32, as shown in FIG. 3, or the location 52 may be immediately adjacent the first end 36, if desired. Also, while the thread 48 may extend substantially to the first end 34, as shown in FIG. 3, the thread 48 does not necessarily have to extend all the way to the first end 34. As shown in FIG. 3, substantially all of the thread is not truncated, either at the inner diameter or at the outer diameter thereof, and is thus fully formed, both on the tapered portion 38 and on the cylindrical portion 42 of the shank 32.

In accordance with the present invention, the particular geometry of the screw 30 is such that the ratio of the length L of the tapered portion 38 to the first diameter D1 of the end surface 40 exceeds substantially 1.5. Further, the first diameter D1 of the tapered portion 38 of the shank 32 is less than, but substantially equal to the second diameter D2 of the cylindrical portion 42 of the shank 32. Consequently, the tapered portion 38 of the screw 30 is generally longer and thinner than that of prior-art self-tapping screws. Moreover, because the first diameter D1 substantially equals the second diameter D2, the screw 30 of the present invention cannot terminate in a sharp point but must terminate in the substantially circular end surface 40, as shown.

The above-described geometric properties of the screw 30 serve to improve the performance of the screw 30. In particular, the total time required to seat the screw 30 in an untapped hole is relatively low compared to the time required to seat prior-art self-tapping screws. In addition, the seating torque and the back-out torque required to insert and remove the screw 30, respectively, are lower than for prior-art self-tapping screws. As a result, substantial time savings are attainable through the use of screws 30 according to the present invention.

Exemplary dimensions for a screw 30 meeting the above-described geometric requirements include a first diameter D1 of the end surface 40 substantially equal to 0.215 inches, a second diameter D2 of the cylindrical portion 42 substantially equal to 0.2732 inches, and an axial length L of the tapered portion 38 substantially equal to 0.315 inches. These dimensions result in a taper angle θ for the tapered portion 38 (shown in FIG. 2) substantially equal to twelve degrees. This taper angle θ, which, significantly, is generally lower than that of prior-art self-tapping screws, gives rise to a smoother entry of the screw 30 into an untapped hole than can be attained by prior-art self-tapping screws having larger taper angles. Of course, the foregoing exemplary dimensions are only illustrative and may be varied substantially within the scope of the present invention. Moreover, other dimensions of the screw that are not essential to the present invention (e.g., overall screw length, thread pitch, length of the unthreaded portion of the screw shank, etc.) can be designed for any particular application, as desired.

To aid the screw 30 in cutting threads into an untapped hole, at least one notch or flute 54 is disposed at least partially in the tapered portion 38 and extends along the shank 32 and intersects the thread 48. In a particular embodiment, the thread 38 includes a first thread portion 56 extending helically along at least a portion of the tapered portion 38 of the shank 32, and a second thread portion 58 extending helically along at least a portion of the cylindrical portion 42 of the shank 32. The screw 30 also includes exactly four equally spaced flutes, each of which intersects the first and second thread portions 56, 58. Providing the screw 30 with exactly four equally spaced flutes, rather than five flutes as often used in prior-art self-tapping screws, as described above, results in even greater reductions in the seating time and seating torque for the screw 30 compared to prior-art screws.

All of the flutes 54 in a screw 30 may be identical, or they may differ from one another, as desired. Further, each flute 54 may intersect the first and second thread portions 56, 58 once, more than once, or not at all. Also, the first thread portion 56 may extend helically along the entire tapered portion 38 of the shank 32 or along only a portion thereof, as desired.

Each flute 54 may be disposed substantially along a line that is either transverse to, or skewed with respect to, a longitudinal axis 60 of the shank 32. The flute 54 shown in FIG. 3 is disposed along a line that is skewed with respect to the axis 60 of the shank 32. In other words, the flute 54 defines a line that is not parallel to, and does not intersect, the axis 60. Alternatively, the flute 54 may be disposed along a line that is transverse to the axis 60 (i.e., a line that does intersect the axis). Rather than being oriented obliquely along a skewed line as shown in FIG. 3, such a flute would be oriented vertically, and the flute 54 and the axis 60 would be coplanar.

The performance advantages of screws 30 according to the present invention are evidenced by the following data obtained from comparison tests conducted between screws 30 according to the present invention and prior-art self-tapping screws. Three types of prior-art screws were tested in these performance tests. The pre-threading geometries of the tapered portions of the screw of the present invention and one of the prior-art screws, and their respective seating times (insertion times), are summarized in the following table:

|  | Type I (present invention) | Type II (prior art) |
| --- | --- | --- |
| Length L of tapered portion | 0.315 inches | 0.220 inches |
| Diameter D1 of end surface | 0.215 inches | 0.215 inches |
| Diameter D2 of cylindrical portion | 0.2732 inches | 0.2742 inches |
| Ratio L/D1 | 1.53 | 1.02 |
| Average seating time (seconds) | 0.52 | 0.56 |

The other two prior-art screws, a 5/16-18×2 TORX Flat Head Floor TORX screw (Type III) and a 5/16-10×2 Six Lobe Flat Head White Top screw (Type IV) had respective average seating times of 0.55 and 0.56 seconds.

To further illustrate the significance of the 0.03–0.04 second time savings due to the self-tapping screw of the present invention, in a typical application of these screws, such as in the assembly of a flat-bed trailer, 1400 such screws may be used in each trailer. If 70 such trailers are to be assembled, the aggregate time savings that may be realized, as a result of the 0.03 second reduction in seating time per screw obtained under laboratory testing conditions, is 2940 seconds (0.82 hours).

It should be noted that actual, non-laboratory results may differ from the results obtained under laboratory conditions. To illustrate, under actual installation conditions, assembling one trailer having 1400 screws takes thirty minutes using the Type III prior-art screw, but takes only twenty minutes using the Type I screw of the present invention. Hence, the average seating time is 1.29 seconds for Type III prior-art screws and only 0.86 seconds for Type I screws according to the present invention—an average per-screw savings of 0.43 seconds. Assembling 70 trailers with 1400 screws in one day therefore results in a savings of about 70×1400×0.43 (about 421,000 seconds or about 11.67 worker-hours saved per day).

The foregoing description is for the purpose of teaching those skilled in the art the best mode of carrying out the invention and is to be construed as illustrative only. Numerous modifications and alternative embodiments of the invention will be apparent to those skilled in the art in view of this description. The details of the disclosed structure may be varied substantially without departing from the spirit of the invention, and the exclusive use of all modifications within the scope of the appended claims is reserved.

What is claimed is:

1. A self-tapping screw fastener comprising:

a shank having first and second ends, a tapered portion of a predetermined axial length adjacent the first end of the shank and terminating in a substantially circular end surface having a first diameter at the first end, and a substantially cylindrical portion having a second diameter extending from the second end to the tapered portion;

a head disposed at the second end of the shank; and a threaded portion extending helically along a circumferential outer surface of the shank from a location near the head substantially to the first end such that the threaded portion at least partially covers each of the cylindrical and tapered portions of the shank;

wherein the ratio of the length of the tapered portion to the first diameter of the end surface exceeds substantially 1.5;

wherein the first diameter is less than but substantially equal to the second diameter;

wherein the threaded portion includes threads on the tapered portion of the shank; and wherein substantially all of the threads on the tapered portion of the shank are fully formed.

2. The self-tapping screw of claim 1, wherein the tapered portion has a taper angle substantially equal to twelve degrees.

3. The self-tapping screw of claim 1, wherein the first diameter of the end surface of the shank is substantially 0.206 inches, the second diameter of the cylindrical portion of the shank is substantially 0.2732 inches, and the axial length of the tapered portion of the shank is substantially 0.315 inches.

4. The self-tapping screw of claim 1, wherein the tapered portion has exactly four flutes each disposed at least partially therein and extending along the shank, wherein each of the four flutes in the tapered portion intersects the threaded portion.

5. The self-tapping screw of claim 4, wherein the threaded portion includes a first threaded portion extending helically along at least a portion of the tapered portion of the shank and a second threaded portion extending helically along at least a portion of the cylindrical portion of the shank and wherein each flute intersects the first and second threaded portions.

6. The self-tapping screw of claim 5, wherein each flute intersects the second threaded portion exactly once.

7. The self-tapping screw of claim 5, wherein the first threaded portion extends helically along the entire tapered portion of the shank.

8. The self-tapping screw of claim 4, wherein each flute is disposed substantially along a line that is transverse to a longitudinal axis of the shank.

9. The self-tapping screw of claim 4, wherein each flute is disposed substantially along a line that is skewed with respect to a longitudinal axis of the shank.

10. The self-tapping screw of claim 1, including four flutes each disposed at least partially therein and extending along the shank, wherein each of the four flutes in the tapered portion intersects the threaded portion, and wherein the flutes are disposed equally spaced from each other around the shank.

11. A self-tapping screw fastener, comprising:

a shank having first and second ends, a tapered portion of a predetermined axial length adjacent the first end of the shank and terminating in a substantially circular end surface having a first diameter at the first end, and a substantially cylindrical portion having a second diameter extending from the second end to the tapered portion;

the tapered portion having four flutes equally spaced around the tapered portion and the shank and with each flute disposed at least partially therein and extending along the shank;

a head disposed at the second end of the shank; and a thread extending helically along a circumferential outer surface of the shank from a location near the head substantially to the first end such that the thread at least partially covers each of the cylindrical and tapered portions of the shank;

wherein substantially all of the thread partially covering the tapered portion of the shank is fully formed;

wherein the ratio of the length of the tapered portion to the first diameter of the end surface exceeds substantially 1.5, and wherein the first diameter is less than but substantially equal to the second diameter; and wherein each of the four flutes in the tapered portion intersects the thread.

12. The self-tapping screw of claim 11, wherein the tapered portion has a taper angle substantially equal to twelve degrees.

13. The self-tapping screw of claim 11, wherein the first diameter of the end surface of the shank is substantially 0.206 inches, the second diameter of the cylindrical portion of the shank is substantially 0.2732 inches, and the axial length of the tapered portion of the shank is substantially 0.315 inches.

14. The self-tapping screw of claim 12, wherein the thread includes a first thread portion extending helically along at least a portion of the tapered portion of the shank and a second thread portion extending helically along at least a portion of the cylindrical portion of the shank and wherein each flute intersects the first and second thread portions.

15. The self-tapping screw of claim 14, wherein each flute intersects the second thread portion exactly once.

16. The self-tapping screw of claim 14, wherein the first thread portion extends helically along the entire tapered portion of the shank.

17. The self-tapping screw of claim 11, wherein each flute is disposed substantially along a line that is transverse to a longitudinal axis of the shank.

18. The self-tapping screw of claim 11, wherein each flute is disposed substantially along a line that is skewed with respect to a longitudinal axis of the shank.

* * * * *